Dec. 20, 1927.
D. H. GARBER
1,653,267
DEVICE FOR PULLING CABLES AND FLEXIBLE CONDUITS
Filed Aug. 7, 1924
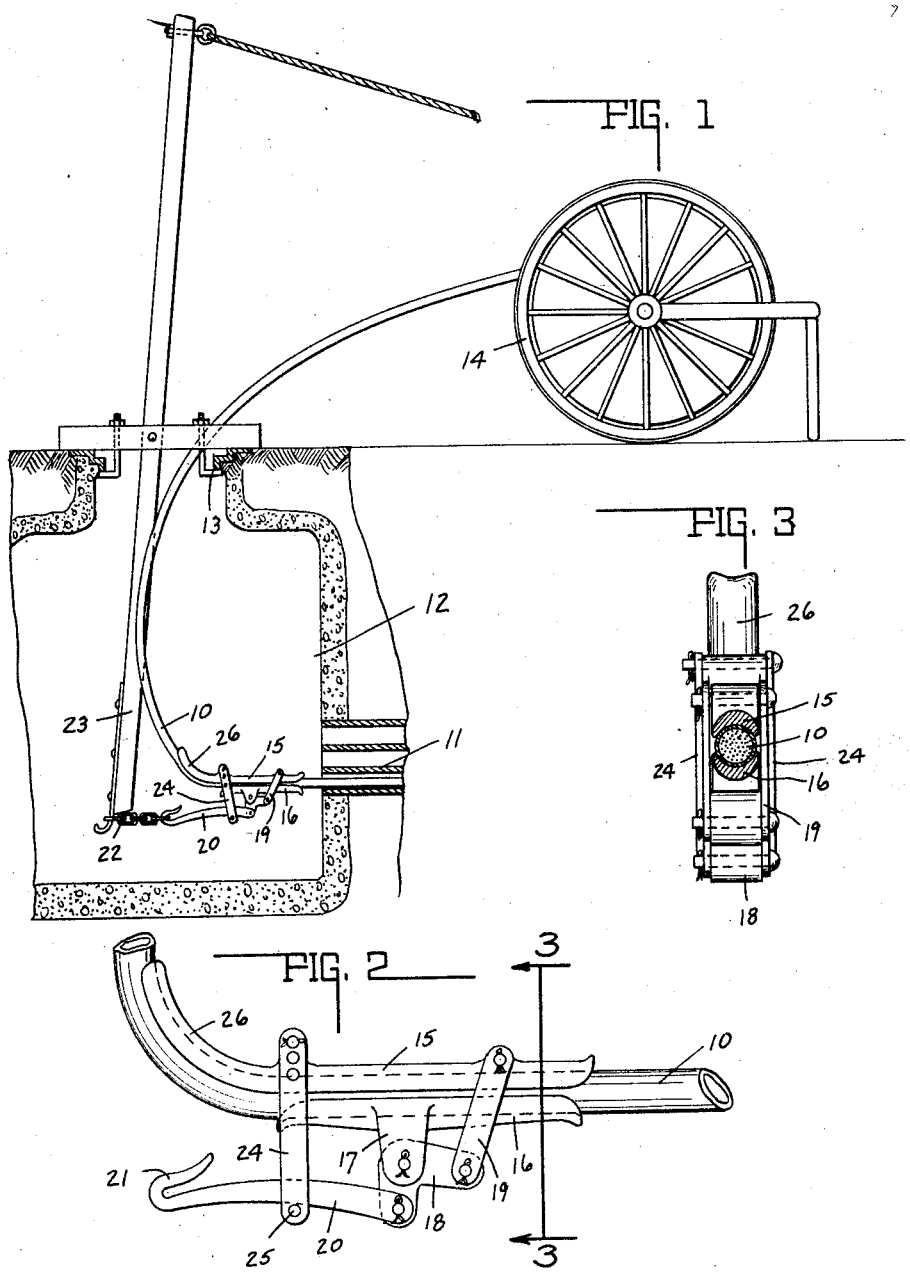
INVENTOR.
DANIEL H. GARBER, DECEASED
BY GERTRUDE E. DUNN, AND
AMY C. NEER
HIS EXECUTRIXES.
BY
ATTORNEYS.

Patented Dec. 20, 1927.

1,653,267

UNITED STATES PATENT OFFICE.

DANIEL H. GARBER, DECEASED, BY GERTRUDE E. DUNN AND AMY C. NEER, EXECUTRICES, OF INDIANAPOLIS, INDIANA.

DEVICE FOR PULLING CABLES AND FLEXIBLE CONDUITS.

Application filed August 7, 1924.  Serial No. 730,615.

This invention pertains to a device for pulling cables, conduits or the like, and particularly such cables as are generally positioned in conduits under ground, particular reference being had to Letters Patent No. 864,530, dated August 27, 1907.

With the introduction of electrical equipment in large units and the pressing public demand that all electrical conductors shall be placed under ground in suitable conduits, great difficulty is experienced in the pulling of the cumbersome heavily insulted cables without injury thereto especially with the apparatus that is in general use for this purpose, and when a number of such cables have been placed in the conduit and by the pressure of their combined weight they are wedged down in the usually limited space and it becomes necessary to remove a cable or a number of them, as necessity often occurs for the purpose of inspection and repair greater difficulty is encountered in the removal or pulling out of the cable than was originally experienced in pulling it into the conduit, and this invention relates to pulling devices of practical utility and simplicity of construction adapted either to underground or overhead work, and which will in no way injure the cable, its insulation, or metallic sheath.

The surfaces of the jaws of the clamping portion of this invention are of ample length and form, partially encircling the cable so that when they are compressed in gripping the cable preparatory to giving it a pull no injury is done to the structure of the cable or to its electrical efficiency; and with this invention, the strain coming upon the draw bar from the pulling power is so distributed to the clamping device that the cable is not bent or buckled in the process of pulling out of the conduit. In use this device can be adjusted practically for several different sizes of cables by substituting links connecting between the shoes or jaws and by the use of suitably shaped interchangeable jaws, wires or ropes may be pulled or stretched with equal facility.

The principal feature of the invention resides in the forwardly extending curved lip for restraining the cable as it is pulled through a conduit and preventing its being cracked or broken at the end of the pulling device at each operation thereof. It is necessary to pull such cables through a restricted opening in the top of a manhole, and consequently the cable is caused to extend almost directly upward from the pulling device. It has been found that in the use of the device disclosed in the above-mentioned Letters Patent, as the cable is reeled up through the top of the manhole, it is pulled at such an angle with respect to the pulling device that it often breaks or cracks at the end thereof, causing appreciable damage. This invention contemplates the use of such a projecting curved guide tongue as to at all times keep the upwardly extending cable from being drawn at too great an angle, thereby protecting it against damage.

The full nature of the invention will be understood from the accompanying drawings and the following description and claims:

In the drawings, Figure 1 is a diagrammatic illustration of the manner of employing the pulling device. Fig. 2 is a side elevation of the pulling device applied to a cable. Fig. 3 is a section taken on the line 3—3 of Fig. 2.

In the drawings there is shown a cable or flexible conduit 10 extending through the underground conduits 11 into a manhole 12 and upwardly through a restricted opening 13 thereof into a reel 14.

The pulling device comprises an upper or main jaw or shoe 15, and a lower gripping jaw or shoe 16 between which the cable is adapted to be clamped, each of said jaws or shoes having an internal curvature such as to embrace the exterior of the tubular cable. The lower gripping jaw is provided with an ear 17 on which is pivotally mounted a bell crank 18. One end of the bell crank 18 is connected by a link 19 to the upper jaw 15 intermediate its ends. The other end of the bell crank lever is pivotally connected with a pull bar 20 having a hook 21 on one end thereof over which a chain 22 may be hooked for exerting a pull thereon by means of a lever 23. Pivotally connected with the upper shoe or jaw 15 near the opposite end thereof from the link 19, there is a saddle link 24 adapted to embrace the draw bar 20 and normally maintain it in position by means of a pin 25. The saddle link is so arranged that upon a pull being exerted upon the draw bar, it is pulled downwardly, thereby causing a downward pull on the jaw 15 against the jaw 16 which is forced upwardly through the medium of the bell crank lever 18. This, in connection with a somewhat similar action by the link 19, effects a clamping of the cable between the jaws when a drawing force is applied to the draw bar.

Formed integral with the upper shoe 15 and extending forwardly therefrom there is an elongated and curved guide tongue 26, curved in cross section to accommodate it to the cable. Said tongue is provided with an easy curve of a sufficiently great radius of curvature as to at all times maintain the cable against breakage, but at the same time permitting it to readily pass upwardly at right angles to the jaws. This permits of the rapid handling of the cable without the danger, as heretofore, of it being damaged in removing it from an underground conduit. It is also obvious that the invention is adaptable for pulling cable in overhead work, and particularly when the cable is caused to pass downwardly through a manhole, or dropped downwardly onto the ground.

The saddle link 24 has for its chief function holding the bracket extension 26 of the jaw 15 on the inside bend of the cable substantially in place. The said link is not fixed to anything else than said extension 26 as it has a loose connection with the member 20 so that it is free to yield upwardly somewhat and thus furnish a relatively yielding means for holding extension 26 in place for protecting the bend of the cable. This is helpful because of the varying degree of outward feeding movement that the cable has and also the varying degree of pull of the means upon which it is wound above the ground.

The invention claimed is:

1. A device for pulling a flexible cable or the like comprising a pair of clamping jaws adapted to engage a cable on opposite sides thereof and guide the same while it is being pulled, an elongated curved and longitudinally grooved projecting member rigidly connected with and extending from the end of one of said jaws, and means connected with the clamping jaws which both clamps the jaws and longitudinally moves the same in a line parallel with the clamping jaws but tangential of the convex side of said extension, whereby the cable can bend over said extension while the same is being pulled by the movement of the clamping jaws and prevent extreme bending of the cable.

2. A device for pulling a flexible cable and the like which bends at the pulling point, comprising a pair of jaws adapted to engage the cable on opposite sides thereof with one of said jaws provided with an extension curved transversely to fit the cable and longitudinally to support the bend of the cable, a lever construction pivoted on one jaw and connected with the other jaw near one end thereof in order to clamp the jaws on the cable, and means pivotally connected at one end with said first-named jaw adjacent said curved extension and loosely held by said lever construction so as to yieldingly aid in holding said extension in place, substantially as set forth.

3. A device for pulling a flexible cable and the like which bends at the pulling point, consisting of a pair of clamping jaws adapted to bind the cable on opposite sides thereof, one of said jaws being integrally extended to support the cable on the inside of its bend, ears on the other and shorter jaw, a bell-crank lever pivoted in said ears, links connecting one end of said bell crank lever with said longer jaw near the end thereof opposite the curved extension, a pull bar connected with the other end of the bell crank lever for operating it and said clamping jaws when the pull bar is pulled longitudinally, a saddle link pivotally connected at one end to said first-named jaw adjacent said curved extension and with said pull bar extending laterally through the other end of said saddle link, substantially as and for the purpose set forth.

In witness whereof, we have hereunto affixed our signatures.

GERTRUDE E. DUNN,
AMY C. NEER,
*Executrices of Daniel H. Garber, Deceased.*